US011474699B1

(12) United States Patent
Saha et al.

(10) Patent No.: US 11,474,699 B1
(45) Date of Patent: Oct. 18, 2022

(54) SYSTEMS AND METHODS FOR OPTIMIZING DATA MANAGEMENT WITHIN KEY VALUE STORAGE

(71) Applicants: Manoj Pravakar Saha, Miami, FL (US); Janki Bhimani, Miami, FL (US)

(72) Inventors: Manoj Pravakar Saha, Miami, FL (US); Janki Bhimani, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/340,573

(22) Filed: Jun. 7, 2021

(51) Int. Cl.
G06F 3/06 (2006.01)
H04L 9/06 (2006.01)

(52) U.S. Cl.
CPC .......... *G06F 3/0604* (2013.01); *G06F 3/0655* (2013.01); *G06F 3/0679* (2013.01); *H04L 9/0643* (2013.01)

(58) Field of Classification Search
CPC .............................. G06F 3/0604; G06F 3/0679
See application file for complete search history.

(56) References Cited

U.S. PATENT DOCUMENTS

| 8,924,687 | B1 | 12/2014 | Frailong et al. | |
| 2008/0186970 | A1* | 8/2008 | Wisener | H04L 45/7457 370/395.31 |
| 2020/0159726 | A1* | 5/2020 | Miller | G06F 16/2455 |
| 2020/0192940 | A1* | 6/2020 | Tomlinson | G06F 16/9027 |
| 2020/0201854 | A1* | 6/2020 | Miller | G06F 16/2455 |
| 2020/0349149 | A1* | 11/2020 | Wang | G06F 16/13 |
| 2021/0026862 | A1* | 1/2021 | Blaas | G06F 16/254 |
| 2021/0248107 | A1* | 8/2021 | Hou | G06F 12/0246 |

OTHER PUBLICATIONS

Wikipedia, hopscotch hashing, Nov. 8, 2019 [retrieved from internet Jan. 12, 2022][<URL:https://web.archive.org/web/20121108083707/https://en.wikipedia.org/wiki/Hopscotch_hashing>] (Year: 2012).*

* cited by examiner

*Primary Examiner* — David Yi
*Assistant Examiner* — Nicholas A. Paperno
(74) *Attorney, Agent, or Firm* — Saliwanchik, Lloyd & Eisenschenk

(57) ABSTRACT

Systems and methods for optimizing the internal metadata management of key-value solid state drives (KVSSDs) are provided. A key-to-physical-address (K2P) mapping scheme (resizable hash-based indexing) that focuses on index resizing and space optimization can be used. The resizable metadata management scheme can efficiently handle a highly variable workload in an incredibly large keyspace. It can provide predictable metadata access cost, as well as fast membership checking. The metadata management structure can be designed to ensure near-constant performance in terms of metadata access cost and fast membership checking.

3 Claims, 10 Drawing Sheets

| Baidu Atlas - Write | | FB Memcached - ETC | |
|---|---|---|---|
| Request Size | Requests | Request Size | Requests |
| 0-4KB | 1.2% | 0-11B | 40% |
| 4-16KB | 1.0% | 12-100B | 10% |
| 16-32KB | 0.8% | 101B-1KB | 45% |
| 32-64KB | 1.2% | 1KB-1MB | 5% |
| 64-128KB | 1.7% | | |
| 128-256KB | 94.1% | | |
| 34M-2.7B keys(4TB SSD) | | 6-186B keys(1TB SSD) | |

FIG. 4

| | KVFTL | KVSSD (LSM) | KVSSD* (Hash Table) | RHIK |
|---|---|---|---|---|
| Virtually unlimited key support | NA | ✓ | ✓ | ✓ |
| Fast membership checking | NA | ✗ | ✗ | ✓ |
| Fixed-cost metadata preprocessing | NA | ✗ | ✗ | ✓ |
| Large value size | ✗ | | | ✓ |

FIG. 5

SYSTEMS AND METHODS FOR OPTIMIZING DATA MANAGEMENT WITHIN KEY VALUE STORAGE

BACKGROUND

With the advent of unstructured data, key-value databases have become prevalent in recent times. While such databases provide flexibility and scalability, this comes at a significant data management overhead on the host system. Typically, the key-value pairs are written to files first, then the files are converted to logical blocks, and the logical blocks are written to flash pages. These data conversions in multiple layers stem from the mismatch in data granularity and access methods between the host-side application and the storage device. The additional data conversions and metadata management introduces performance bottlenecks in the system.

BRIEF SUMMARY

Embodiments of the subject invention provide novel and advantageous systems and methods for optimizing the internal metadata management of key-value solid state drives (KVSSDs). A key-to-physical-address (K2P) mapping scheme that focuses on index resizing and space optimization can be used, and this scheme can be referred to herein as resizable hash-based indexing (RHIK). The resizable metadata management scheme can efficiently handle a highly variable workload in an incredibly large keyspace. It can provide, or even guarantee, predictable metadata access cost, as well as fast membership checking. The metadata management structure can be designed to ensure near-constant performance in terms of metadata access cost and fast membership checking.

In an embodiment, a system for optimizing internal metadata management of a KVSSD can comprise a processor and a (non-transitory) machine-readable medium in operable communication with the processor and having instructions stored thereon that, when executed by the processor, perform the following steps: receiving data of the KVSSD; and utilizing a K2P mapping scheme on the data of the KVSSD to transform variable-sized keys of the data into fixed-size key hashes using a hash function, thereby optimizing the internal metadata management of the KVSSD. The K2P mapping scheme can comprise a two-level hash table with high occupancy, the two-level hash table comprising a first layer and a second layer, the first layer of the two-level hash table being configured as a directory with D entries, D being an integer, and the second layer of the two-level hash table comprising an index of fixed-size independent hash tables that store metadata of corresponding key-value pairs. The fixed-size key hashes can be, for example, 64-bit key hashes. The utilizing of the K2P mapping scheme can comprise using the fixed-size key hashes as identifiers of the variable-sized keys, respectively. The value of D can be set initially to an arbitrary value and then updated as the index of the second layer of the two-level hash table is resized. Alternatively, the value of D can be set initially based on the equation for D presented herein and then updated as the index of the second layer of the two-level hash table is resized. The first layer of the two-level hash table can be accessed via solid state device (SSD) dynamic random access memory (DRAM). A periodically updated persistent copy of the D entries of the first layer of the two-level hash table can reside on flash memory. The second layer of the two-level hash table can be served from flash memory or cache. The utilizing of the K2P mapping scheme can comprise utilizing the fixed-size key hashes for probabilistic membership checking (e.g., during a store, read, write, and/or delete operation). The utilizing of the K2P mapping scheme can comprise resizing the index of the second layer of the two-level hash table when a total occupancy of the index of the second layer of the two-level hash table reaches a predetermined threshold (e.g., 70%, 75%, 80%, 85%, 90%, 95%).

In another embodiment, a method for optimizing internal metadata management of a KVSSD can comprise: receiving (e.g., by a processor) data of the KVSSD; and utilizing (e.g., by the processor) a K2P mapping scheme on the data of the KVSSD to transform variable-sized keys of the data into fixed-size key hashes using a hash function, thereby optimizing the internal metadata management of the KVSSD. The K2P mapping scheme can comprise a two-level hash table with high occupancy, the two-level hash table comprising a first layer and a second layer, the first layer of the two-level hash table being configured as a directory with D entries, D being an integer, and the second layer of the two-level hash table comprising an index of fixed-size independent hash tables that store metadata of corresponding key-value pairs. The fixed-size key hashes can be, for example, 64-bit key hashes. The utilizing of the K2P mapping scheme can comprise using the fixed-size key hashes as identifiers of the variable-sized keys, respectively. The value of D can be set initially to an arbitrary value and then updated as the index of the second layer of the two-level hash table is resized. Alternatively, the value of D can be set initially based on the equation for D presented herein and then updated as the index of the second layer of the two-level hash table is resized. The first layer of the two-level hash table can be accessed via solid state device (SSD) dynamic random access memory (DRAM). A periodically updated persistent copy of the D entries of the first layer of the two-level hash table can reside on flash memory. The second layer of the two-level hash table can be served from flash memory or cache. The utilizing of the K2P mapping scheme can comprise utilizing the fixed-size key hashes for probabilistic membership checking (e.g., during a store, read, write, and/or delete operation). The utilizing of the K2P mapping scheme can comprise resizing the index of the second layer of the two-level hash table when a total occupancy of the index of the second layer of the two-level hash table reaches a predetermined threshold (e.g., 70%, 75%, 80%, 85%, 90%, 95%).

BRIEF DESCRIPTION OF DRAWINGS

FIG. 4 shows a table with diversity in the request sizes for different workloads.

FIG. 5 shows a table summarizing goals for designing an efficient indexing scheme for KVSSDs.

DETAILED DESCRIPTION

Figure 1:
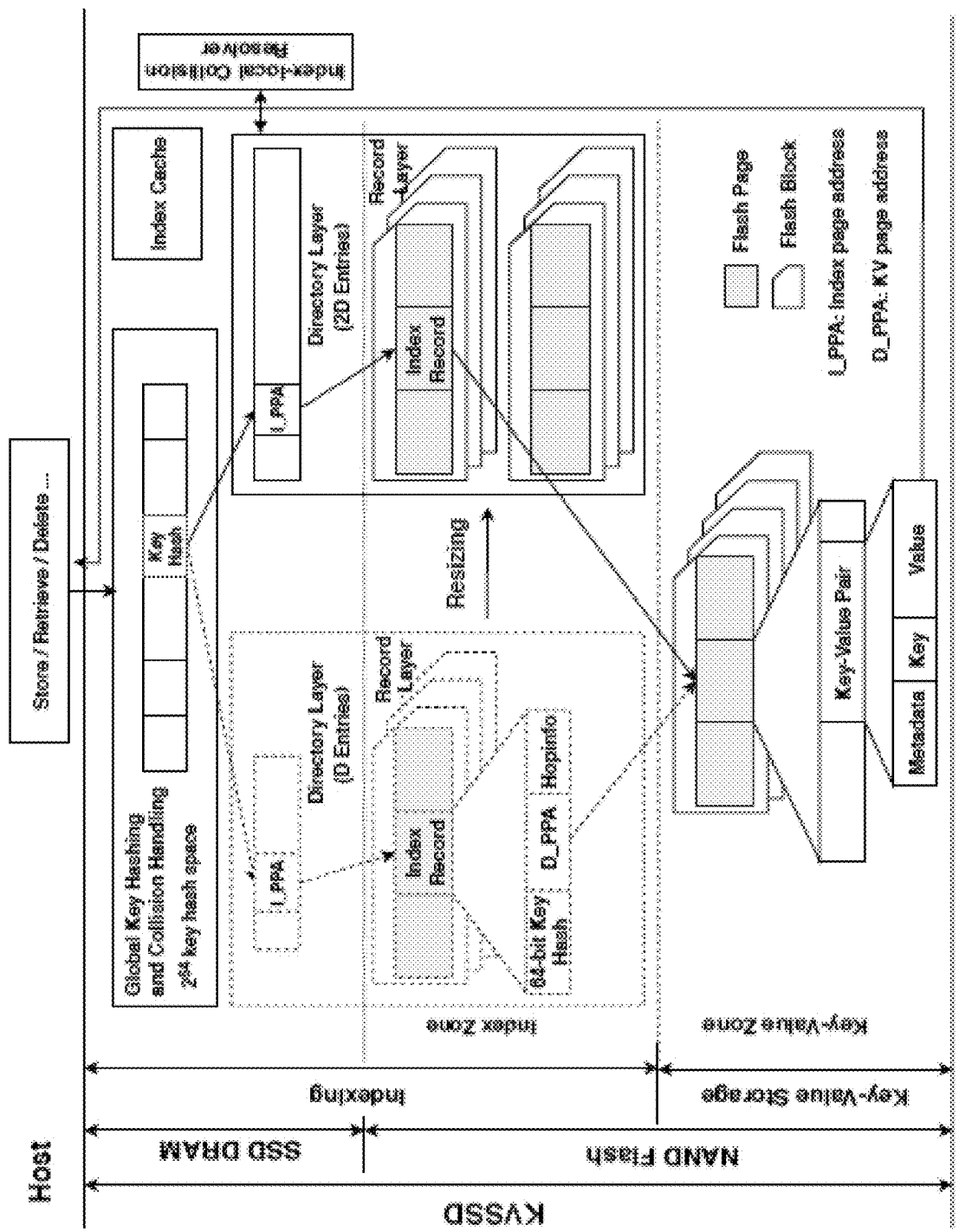
FIG. 1 shows a schematic view of an architecture that can be used with embodiments of the subject invention.

Embodiments of the subject invention provide novel and advantageous systems and methods for optimizing the internal metadata management of key-value solid state drives (KVSSDs). A key-to-physical-address (K2P) mapping scheme that focuses on index resizing and space optimization can be used, and this scheme can be referred to herein as resizable hash-based indexing (RHIK). The resizable metadata management scheme can efficiently handle a highly variable workload in an incredibly large keyspace. It can provide, or even guarantee, predictable metadata access cost, as well as fast membership checking. The metadata management structure can be designed to ensure near-constant performance in terms of metadata access cost and fast membership checking.

Embodiments of the subject invention can: efficiently handle higher-order keyspaces; provide fast membership checking without accessing the persistent key-value pairs; provide a deterministic cost for record access; support unrestricted maximum value-size; and provide a flexible and efficient metadata management scheme designed for key-value storage that uses a two-level hash table structure to store records about the storage locations of the key-value pairs. The metadata management scheme can transform variable-size keys into fixed-size key identifiers in a global keyspace. The fixed-size key identifier can be used for record management, membership checking, and fast resizing. The first level of the hash structure can be resized when the number of records reaches a predefined threshold, and new hash tables can be generated in the second level of the structure. Records can be redistributed in the new hash tables in the second level. The records can be designed to support membership checking and resizing without accessing the key-value stored in the system. In addition, the two-level structure can ensure fixed cost access to records regardless of the number of records. In view of the challenges discussed in the Background, some related art methods attempt to provide direct object or key-value interfaces to the storage device, and/or streamlining multi-layer data conversions into a single layer. A recent attempt includes use of KVSSDs, along with a standardized application programming interface (API) for key-value storage. Because KVSSDs support variable-sized keys and values, the old data indexing technique of logical block address to physical address (L2P) mapping has issues. Because storage devices rely on efficient hash table-based mapping techniques, anticipating the number of keys the KVSSD would store is important. However, the variable-sized workloads make it impossible to predict the exact number key-value pairs expected to be stored in a KVSSD. This creates hurdles in designing a size- and space-efficient indexing technique for KVSSDs. In addition, on-flash data management for variable-sized key-value pairs remains a challenge from a performance perspective. Moreover, the limit on maximum permissible value size is detrimental for the adoption of KVSSDs in application environments that support higher value sizes.

Designing an efficient metadata management scheme for KVSSD introduces a number of challenges, including adapting a key-value interface on top of existing flash storage device and accommodating variability of workloads. Other challenges include adapting key-value pairs, unpredictable workloads, fast metadata processing, and fast membership checking.

Because KVSSDs rely on existing NAND flash controllers, a block-oriented flash translation layer (FTL) can be extended to support variable-size key-value pairs. However, directly replacing logical block addresses (LBAs) with keys in the current logical to physical location map/index is not feasible because keys are of arbitrary size and range. The arbitrary key size problem can be solved easily by transforming variable-size keys into fixed-length key hashes. NVMKV, a FTL-aware key-value store, employs this technique by prepending a computational layer on the host-side on top of an existing logical to physical map of a block-oriented SSD. Inside the computational layer, variable-size keys are first hashed into fixed-length key hashes, and then the variable-sized key-value pairs are mapped to fixed length virtual slots. The address of the key-value pairs within this virtual space are used as LBAs in the index. Because this entire layer is computational, only the existing index needs to be maintained in the SSD (see Marmol et al., NVMKV: A scalable, lightweight, ftl-aware key-value store, In 2015 USENIX Annual Technical Conference (USENIX ATC 15), pages 207-219, Santa Clara, Calif., July 2015, USENIX Association; which is hereby incorporated by reference herein in its entirety). However, adopting this computational layer in the FTL would not be without challenges. Because the underlying index is block-oriented in such a design, unnecessary data conversions would still be needed. The maximum number of keys supported by the device would also be capped by the number of logical blocks (e.g. a 1 terabyte (TB) SSD would only be able to store 2 billion key-value pairs). In addition, the fixed-length virtual slot design in the computational layer places a limit of maximum value size. For example, for a 48-bit LBA with 236 virtual slots, the maximum value size is 512 kilobytes (KB). This is significantly lower than the maximum value size supported by some popular key-value stores (e.g., Facebook's RocksDB supports values up to 3 gigabytes (GB) in size). RHIK overcomes these issues by designing a key-value aware indexing scheme (e.g., K2P mapping) by directly mapping key-value pairs to physical flash pages.

Workloads in real world key-value store deployments vary wildly. For example, in Facebook's memcached deployment, typical data units are few hundred bytes in size. This gives a tangible idea about the number of keys a KVSSD would need to support in a Facebook data center (see also FIG. 4). However, if a typical workload in Baidu's Atlas key-value store is considered, the distribution of the workload is completely different. If similar workloads were run on a 4 TB KVSSD, the anticipated number of keys can be between 34 million and 2.2 billion, and values of size between 0 bytes (B) to 256 KB. The wide key range makes the use of block-oriented index structures with a fixed range (e.g., NVMKV) less desirable.

In order to circumvent the range limit, Samsung KVSSD uses a read-friendly multi-level hash table as a global index structure. Another approach is to use write-efficient log-structured merge trees (LSM trees) with a key-range tree. However, both of these approaches increase metadata management as changes in one level translate into updates in multiple levels of the hash table or the key range tree. RHIK reduces such metadata management overhead by limiting the index structure in two levels, adapted to the configuration of the flash device, and scaling horizontally as the index grows in size.

As the index grows, key related operations become expensive. Because the whole index cannot be cached in the embedded dynamic random access memory (DRAM), metadata retrieval in a multi-level index may need multiple flash reads, just to fetch a single record. For example, for a multi-level hash table with five levels where directories and records for each level are stored in different flash pages in the log block of the SSD, five different flash reads may be needed to retrieve an index record (assuming a non-cached record). In order to reduce this issue, the small index large table (SILT) key-value database stores key-value pairs in sorted order, which enables it to maintain a memory-efficient index structure (see Lim et al., Silt: A memory-efficient, high performance key-value store, In Proceedings of the Twenty-Third ACM Symposium on Operating Systems Principles, pages 1-13, ACM, 2011; which is hereby incorporated by reference herein in its entirety). However, this technique would incur high write amplification due to frequent data rearrangements. RHIK achieves fast meta-data processing by limiting such flash reads to maximum of 1, without rearranging key-value pairs.

Membership checking is an integral part of store, retrieve, and delete operations in KVSSD. Related art methods dictate that these operations execute differently based on whether or not the key already exists. Hence, a membership checking has to be done before executing these operations. NVMKV requires retrieving the actual key from data block (see Marmol et al., supra.). This would result in one extra flash read for the operation. Samsung KVSSD employs Bloom filters for local index managers for fast membership checking (see Kang et al., Towards building a high-performance, scale-in key-value storage system, In Proceedings of the 12th ACM International Conference on Systems and Storage, SYSTOR'19, page 144-154, New York, N.Y., USA, 2019, Association for Computing Machinery; which is hereby incorporated by reference herein in its entirety). This would increase the memory footprint of the index, especially if the local indexes grow too big. Moreover, because Bloom filters can concretely assure non-membership only, in order to confirm membership of existing keys retrieving the key from data block is still needed. Kim et al. observed that key handling operations consume 70.8% of a store operation for a 4 KB value (Transaction support using compound commands in key-value ssds, In Proceedings of the 11th USENIX Conference on Hot Topics in Storage and File Systems, HotStorage'19, page 1, USA, 2019, USENIX Association; which is hereby incorporated by reference herein in its entirety). In order to improve key handling operations, RHIK aims to reduce embedder DRAM usage and flash read for membership checking by storing fixed-length key identifiers inside the index records.

KVSSD is a key addressable solid state device (SSD) technology that simplifies storage management for unstructured data and improves system performance with minimal host-side intervention. This is achieved by streamlining the software storage stack and removing redundancy. However, to ensure superior performance for applications, the internal data and metadata management schemes used in KVSSDs have to be optimized. The flash device should be able to perform the basic operations efficiently, such as store, retrieve, delete, and exist. Embodiments of the subject invention address the challenges mentioned above by optimizing the internal metadata management of KVSSDs using a K2P mapping scheme that focuses on index resizing and space optimization. FIG. 5 shows a table of features of RHIK compared to related art architectures. The checkmarks show features included in the respective architecture.

FIG. 1 shows a schematic view of the overall architecture of RHIK as used with embodiments of the subject invention, in relation to the internal component of the KVSSD. RHIK's underlying structure is designed as a two-level hash table with high occupancy. The first layer in RHIK works like a directory, containing D entries (see also Equation 2), and accessed from SSD DRAM. At the same time, a periodically updated persistent copy of these D entries resides on flash. The second layer, or record layer, holds fixed-size independent hash tables that store the metadata of corresponding key-value pairs and is served from flash unless it is available in cache.

RHIK transforms variable-sized keys coming from the application into fixed-size (e.g., 64-bit) key hashes using a simple hash function. This fixed-size key hash can be used as an identifier of the key within the scope of the index. The key hash (e.g., 64-bit key hash) can be used to select the appropriate directory and record corresponding to the key using a variable hash function in the directory layer and a fixed hash function in the record layer, respectively. The variable hash function can use D least significant bits of the key hash (e.g., 64-bit key hash) to compute the target bucket in the directory layer. The value of D can be set arbitrarily or using Equation 2, based on anticipated workload. As the index is resized, the value of D can be updated.

Every entry in the directory layer points to a flash page containing a unique hash table index in the record layer. In record layer, each record in the hash table stores the key hash (e.g., 64-bit key hash), the physical address of the key-value pair on flash, and information related to index occupancy for each bucket (which can also be referred to as "hopinfo"). The size of the record layer hash tables are fixed and can contain R index records (which translates into a fixed hash function for all hash tables in the record layer). R can be chosen such that the total storage space required to store each hash index equals the size of a flash page (see Equation 1, where p is the flash page size, kh is the key hash size, ppa is the physical page address size, and hi is the hopinfo size). When RHIK is deployed in a generic environment and information about expected workload is unknown, it can be initialized conservatively to handle a limited number of keys.

$$R = \left\lfloor \frac{p}{kh + ppa + hi} \right\rfloor \quad (1)$$

$$D = \frac{\text{anticipated number of keys}}{R} \quad (2)$$

In order to further explain the operations of RHIK, the handling of store, retrieve, and delete operations will now be discussed in more detail. When KVSSD receives a store request for a key-value pair, it first computes a key hash (e.g., 64-bit key hash) using a simple hash function. Then, a probabilistic key exist operation can be executed in RHIK to identify whether the key already exists or not. If no record corresponding to the key is found, then an atomic operation can be executed to write the key-value pair on flash and store the corresponding record in the index. A retrieve operation can take the key as input and compute the hash of the key to lookup corresponding record in the index. If the probabilistic key exit operation returns that the key might exist and the probable location of the key-value pair, the key-value pair can be retrieved partially or fully (based on whether it fits in the flash page being retrieved) in the page buffer and it can be checked whether the retrieved key matches with the request key or not. If it is a match, then the value is returned, or a key exist error is returned. In order to handle a delete operation, the key hash can be computed, and the corresponding record can be fetched from the index. The record can then be fetched to match the request key, similar to the retrieve operation. If a match is found, the record is deleted from the index, and the corresponding key-value pair is marked stale for garbage collection.

Because RHIK uses fixed-size hash tables in the record layer, handling collisions within this scope is imperative. In order to handle index-local collisions and achieve high index occupancy in the record layer hash tables, RHIK can employ Hopscotch hashing with hopinfo size 32. If an empty record slot cannot be found within these confines, an uncorrectable error can be returned, and the operation can be aborted.

RHIK can be initialized conservatively to support a limited number of keys in the beginning to reduce space wastage related to provisioning a large under-utilized hash index structure. Once the total occupancy of RHIK reaches a pre-defined threshold (e.g., 80%), its resizing function can be triggered. Every time while resizing, a new index can be initialized with double the capacity of the current active index. The directory layer of the new index can be doubled, compared to the directory layer in the current index. The number of independent hash tables in the record layer can also double, while the size of each independent hash table in the record layer can remain the same. Entries from the old index can then be inserted in the new index. Maintaining single global index is important to serve queries quickly later. A key to achieving faster migration from the old index to the new index lies in the fact that the key hashes (e.g., 64-bit key hashes) corresponding to each key stored in the KVSSD can be stored inside the hash indexes in the secondary layer. These key hashes can be reused to rearrange the records in the new index quickly. The key-value pairs stored in the device are not accessed to re-compute the key hashes. During the migration, all new commands can be kept in the submission queue until the end of the migration process to eliminate any changes of inconsistency from newly incoming requests. After migrating to the new index, the flash pages containing the old index records can be marked stale for the garbage collector, and all operations can be pointed to the new index. All the hash-based data management schemes can have some additional garbage collection due to their index management. However, they provide excellent performance for all the queries and for runtime due to their efficiency in searching the data.

Because the key-exist operation is an integral part of key-value operations, achieving faster membership checking is crucial to ensure faster performance. Embodiments of the subject invention can use a probabilistic membership checking by reusing the key hashes (e.g., 64-bit key hashes), instead of traditional Bloom filter-based approaches. Because the key hashes (e.g., 64-bit key hashes) serve the purpose of a unique key identifier within the confines of the index and are stored inside every record, they can be used to check membership, instead of Bloom filters. This approach provides better results compared to Bloom filter-based approaches, considering the variable size of the key range. However, as index occupancy reaches millions of entries, the probability of getting a collision in the global key hash (e.g., 64-bit global key hash) space increases. That means the probability of correctly identifying a key-exist just from the key hash decreases, and additional flash reads to retrieve the actual key from the flash are needed. However, such expensive operations can be omitted for all key-value operations other than explicit key-exist operation requests. For example, because retrieve operations were intended to read the key-value pair from flash, it can be rechecked whether the request key matches with the retrieved key before returning the value to the requesting application. Write and delete operations can implement the same technique to simplify membership checking.

Limiting the index to two levels and resizing the index to accommodate new metadata ensures that RHIK maintains a predictable execution time for handling keys. Because the directory layer of the index remains small in size (e.g., 0.005 bytes/key for a 32 KB flash page), it can be maintained in the embedded DRAM without taking up much space. Thus, RHIK's design ensures that retrieving index records for any keys stored in the device will take a maximum of 1 flash read (for retrieving the record layer hash table). Compared with related art approaches, using overall performance during store, retrieve, and rate of change in key-exist operation execution as the index grows, RHIK provides favorable results.

RHIK removes the index-induced limit on maximum value size (which is otherwise present in NVMKV) by implementing a key-value aware indexing scheme. The data packing problem is decoupled from the index. It is assumed that the flash storage is logically partitioned into small storage units, and an extent-based data packing technique is implemented to store key-value pairs sequentially. The index only stores the starting address of the key-value pair on flash. The metadata stored with each key-value pair is then used to retrieve the key-value pair. This approach enables the storage of large values.

As non-structured-query-language (NoSQL) applications become increasingly data and memory intensive, the synergistic use of KVSSDs becomes a compelling possibility. The ability to best utilize these disparate technologies to build a unified solution remains a challenge in the related art. Embodiments of the subject invention provide indexing schemes to build a resizable indexing scheme (which can be referred to herein as RHIK) with fast, horizontal scaling to support running variable workloads on KVSSDs. A key-value aware indexing scheme can be used, data packing can be decoupled from indexing, and index-induced maximum value size limits can be removed from KVSSDs. The orthogonal approach of embodiments of the subject invention, of designing a resizable indexing technique, is critically important for KVSSDs to avoid over-allocation of storage space or a constrained number of key-value pairs.

Embodiments of the subject invention address the technical problem of designing an efficient metadata management scheme for KVSSDs by providing the technical solution of using a K2P mapping scheme (RHIK) that focuses on index resizing and space optimization.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods The RHIK architecture was tested on a system including a 2> Intel Xeon Silver 4208 CPU with 2.10 GHz processors, 192 GB DDR4 DRAM, a and Samsung PM983 NVMe KVSSD (firmware version ETAS 1KCA). Because the emulator resides in system memory and is limited by the available memory in the host system, the emulated KVSSD capacity was set at 50 GB. The emulator was configured with erase blocks including 256 flash pages of size 32 KB each, as default. The KVSSD (both emulated and real) was communicated with through SNIA KV API, and the experiments were run using sequential workloads.

An advanced version of KV Emulator was developed by extending OpenMDK KV Emulator (KVEMU). The new KV Emulator imitated the fundamental hardware primitives of a SSD, such as flash blocks, pages, etc. RHIK was implemented in the new KV Emulator and compared to the existing KVEMU.

The performance of RHIK was evaluated to determine whether the use of RHIK is able to dynamically scale the index as per the workloads requirement, without a drastic increase in scaling time with larger index size. The impact of resizing in RHIK was first analyzed. Then, RHIK was evaluated using read and write key-value operations performed in sync and async ways, respectively. The evaluation addresses how RHIK performed compared to related art approaches, how fast RHIK scales as the index grows, and how RHIK behaves for different KVSSD configurations.

Example 1

Figure 2A:
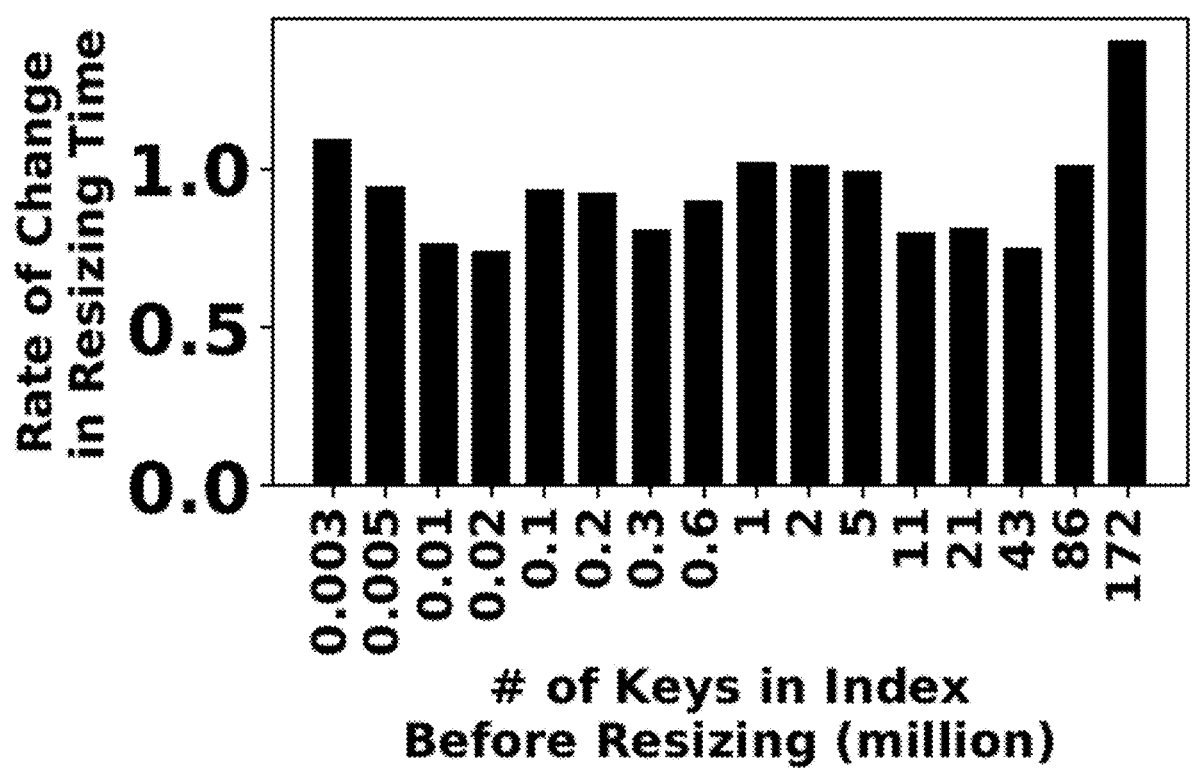
FIG. 2A shows a bar chart of rate of change in resizing time versus number of keys in index before resizing (in millions), showing rate of change of the resizing time to double index size.

Instead of resizing the index whenever a collision occurs, RHIK takes a conservative approach in resizing the index, to reduce space wastage and unnecessary flash reads. The index resize function is triggered when the index contains a preset number of records. By default, RHIK's index occupancy threshold was set at 80%. Upon reaching the threshold, RHIK is resized to double its current size. Next, the rate of increase of RHIK's resizing time was evaluated with an increase in the index size, with the results shown in FIG. 2A. Referring to FIG. 2A, it can be observed that RHIK mostly maintained the rate lower than or equal to 1, which shows that the rate of increase of the resizing time remained constant even while doubling the capacity with increased index size. No related art indexing scheme discusses this property, which is very important for KVSSDs.

Example 2

Figure 2B:
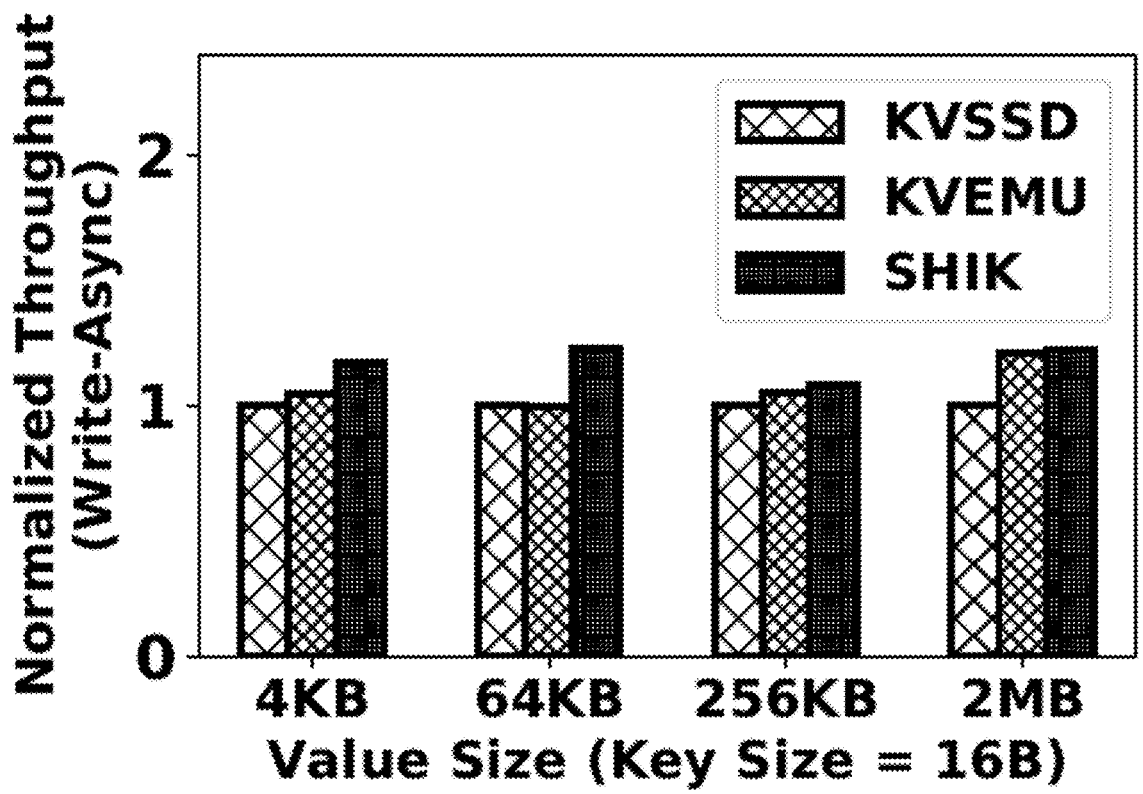
FIG. 2B shows a bar chart of normalized throughput (write-async) versus value size (key size=16 bytes (B)), showing normalized throughput for async writes with different value sizes. At each value size, the left-most bar is for key-value solid state drive (KVSSD), the middle bar is for key-value emulator (KVEMU), and the right-most bar is for resizable hash-based indexing (RHIK) according to an embodiment of the subject invention. Even though the figure legend shows "SHIK", this is actually for RHIK.
Figure 2C:
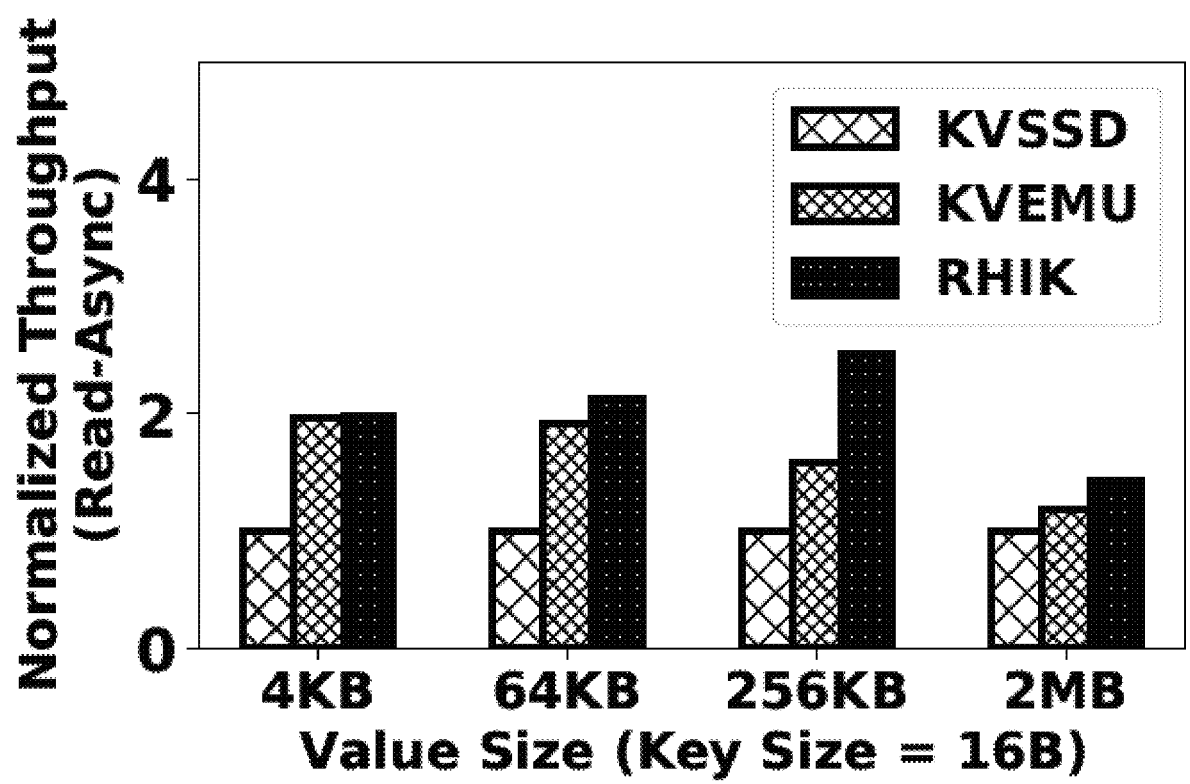
FIG. 2C shows a bar chart of normalized throughput (read-async) versus value size (key size=16 B), showing normalized throughput for async reads with different value sizes. At each value size, the left-most bar is for KVSSD, the middle bar is for KVEMU, and the right-most bar is for RHIK. Even though the figure legend shows "SHIK", this is actually for RHIK.
Figure 2D:
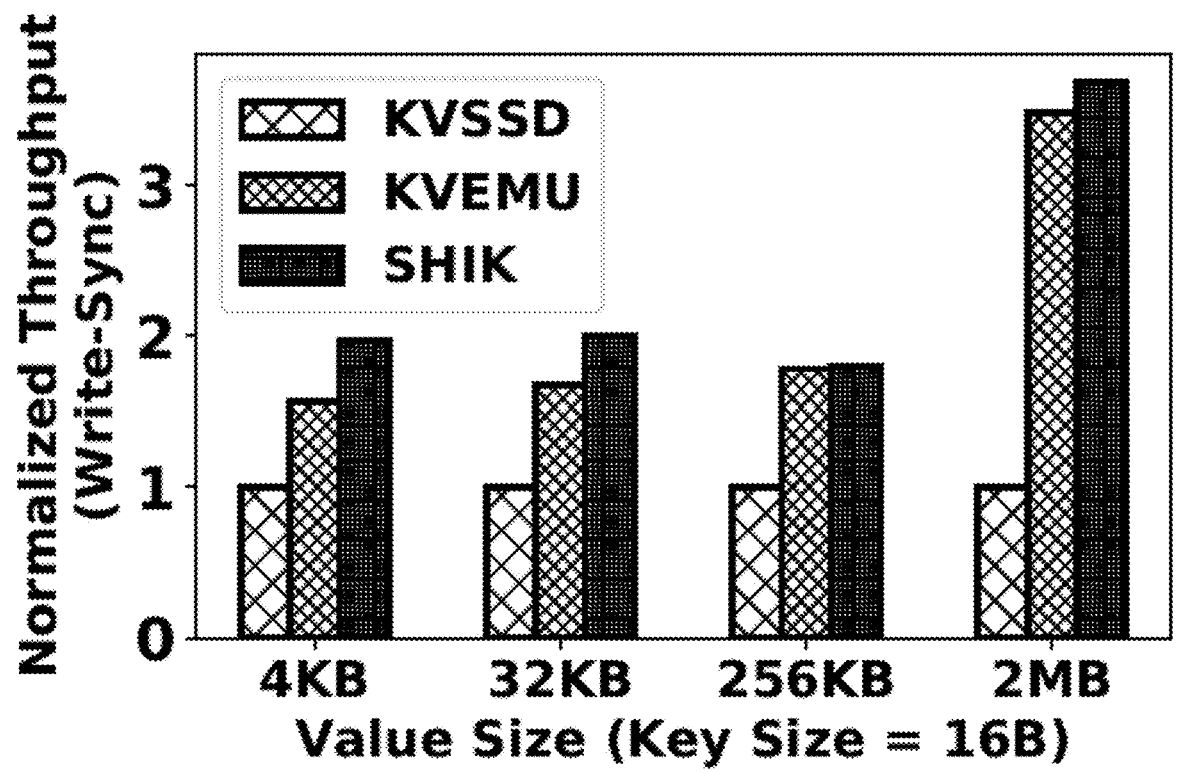
FIG. 2D shows a bar chart of normalized throughput (write-sync) versus value size (key size=16 B), showing normalized throughput for sync writes with different value sizes. At each value size, the left-most bar is for KVSSD, the middle bar is for KVEMU, and the right-most bar is for RHIK. Even though the figure legend shows "SHIK", this is actually for RHIK.
Figure 2E:
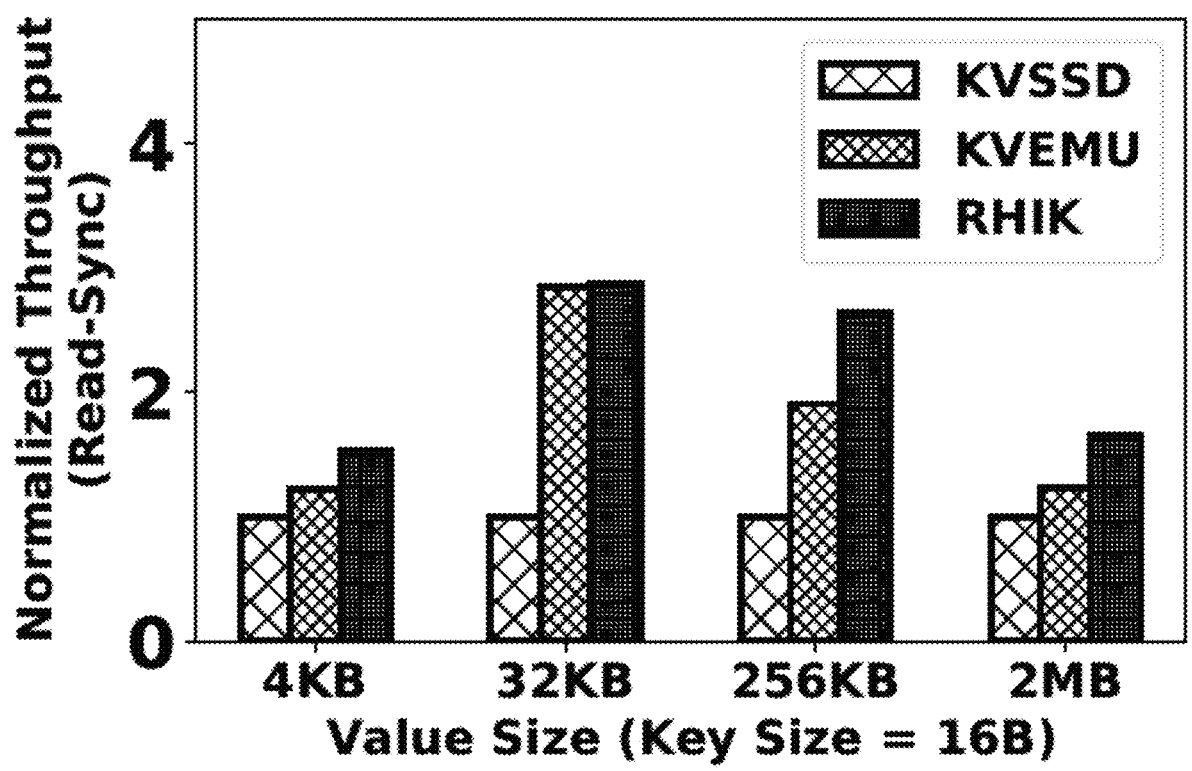
FIG. 2E shows a bar chart of normalized throughput (read-sync) versus value size (key size=16 B), showing normalized throughput for sync reads with different value sizes. At each value size, the left-most bar is for KVSSD, the middle bar is for KVEMU, and the right-most bar is for RHIK. Even though the figure legend shows "SHIK", this is actually for RHIK.

RHIK performance was evaluated using multiple sequential workloads of variable key-value size consolidating to 1 GB. FIG. 2B shows a comparison of RHIK write performance (asynchronous) with Samsung KVSSD and OpenMDK KV Emulator (KVEMU). For almost all value sizes, RHIK achieved higher throughput. The throughput comparison for read performance is shown in FIG. 2C. It can be observed that RHIK is able to perform better with large value sizes during read. The performance trends of the normalized throughput of KVEMU differed from that of KVSSD. This difference in the performance trends may be due to the IOPS model used by the KVEMU.

Example 3

Figure 3A:
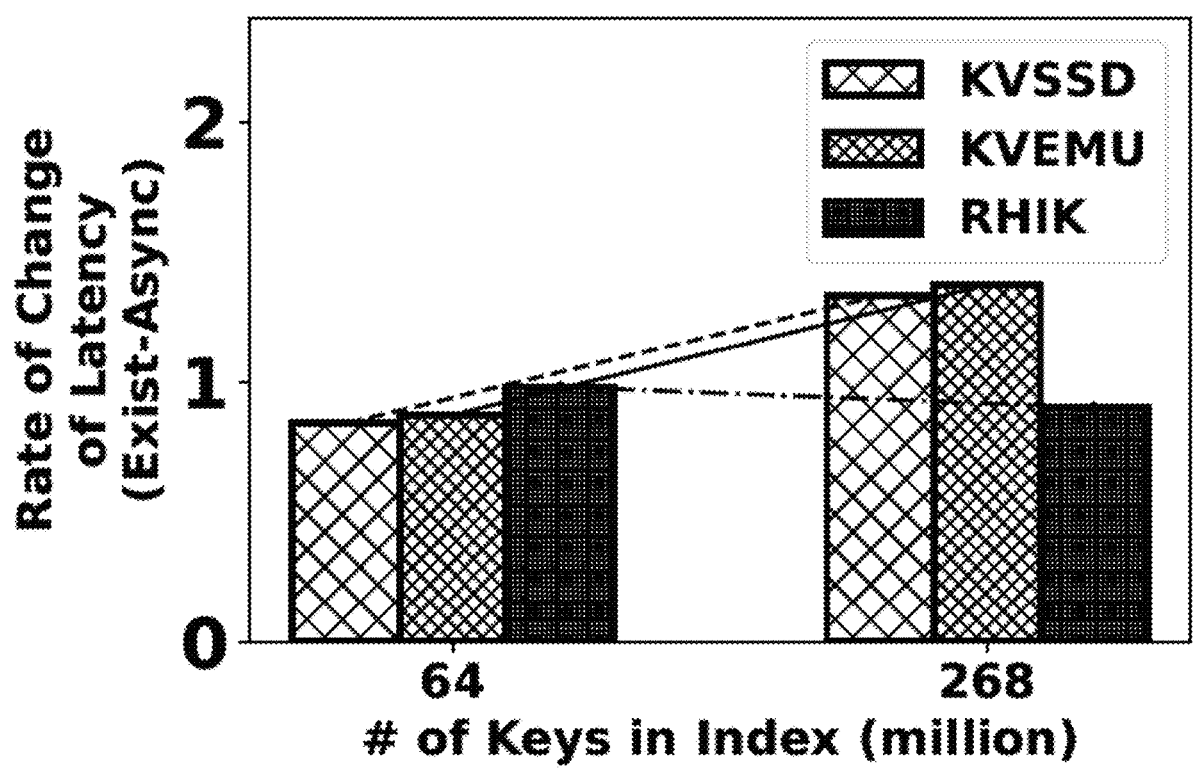
FIG. 3A shows a bar chart of rate of change of latency (exist-async) versus number of keys in index (in millions), showing rate of change of latency while performing key-exist operation in index of different sizes. At each value, the left-most bar is for KVSSD, the middle bar is for KVEMU, and the right-most bar is for RHIK. Even though the figure legend shows "SHIK", this is actually for RHIK.

A sensitivity analysis was performed. FIG. 3A shows the rate of change of the latency while performing key-exist operation in indexes of different sizes. Referring to FIG. 3A, it can be observed that the latency for key-exist operation increases in KVSSD and KVEMU as index size grows. This is because of how the multi-level index grows with the number of keys being inserted on the storage device. In contrast, RHIK maintains almost constant latency even when the index gets large because RHIK limits key-lookup cost to only flash page read at maximum.

Figure 3B:
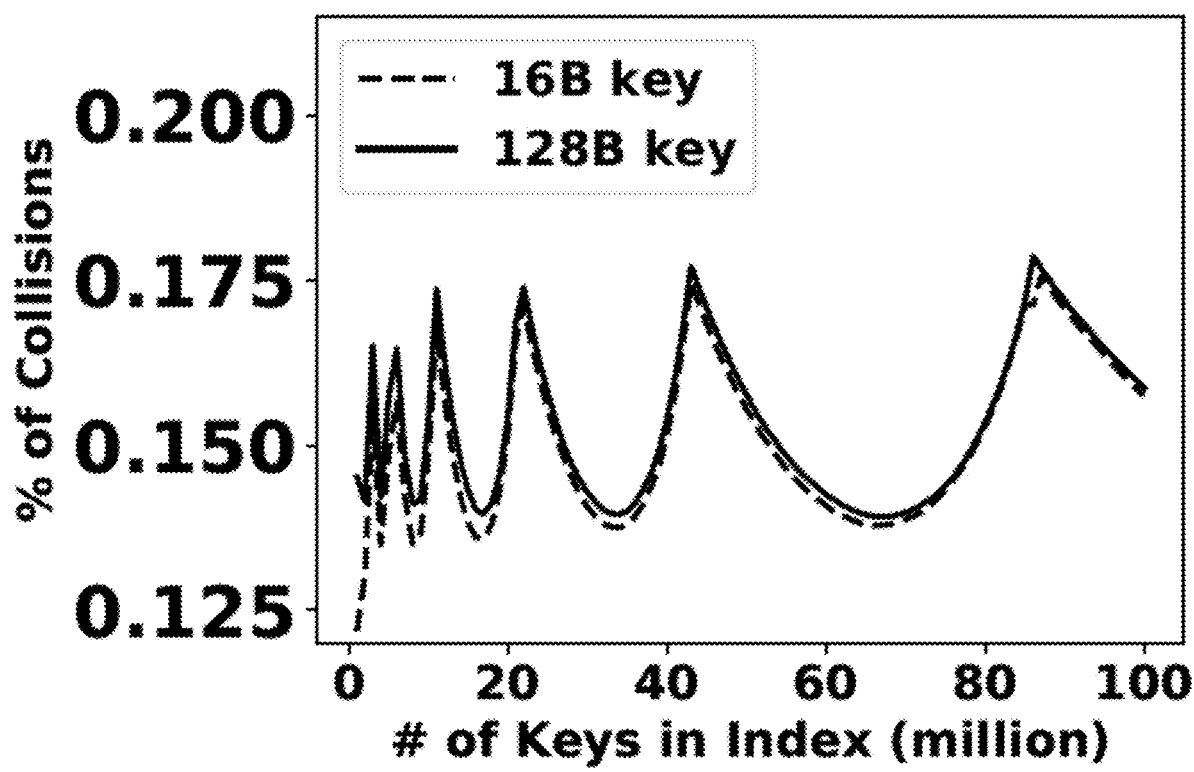
FIG. 3B shows a plot of percentage (%) of collisions versus number of keys in index (in millions), showing the effect of key size on the % of collisions in indexes of different sizes. The dashed curve is for a 16 B key, and the solid curve is for a 128 B key.

Because RHIK uses fixed-length key hashes from a wide global address space, it was analyzed whether collision trends are similar across different key sizes. Referring to FIG. 3B, different size keys show similar collisions trends.

Figure 3C:
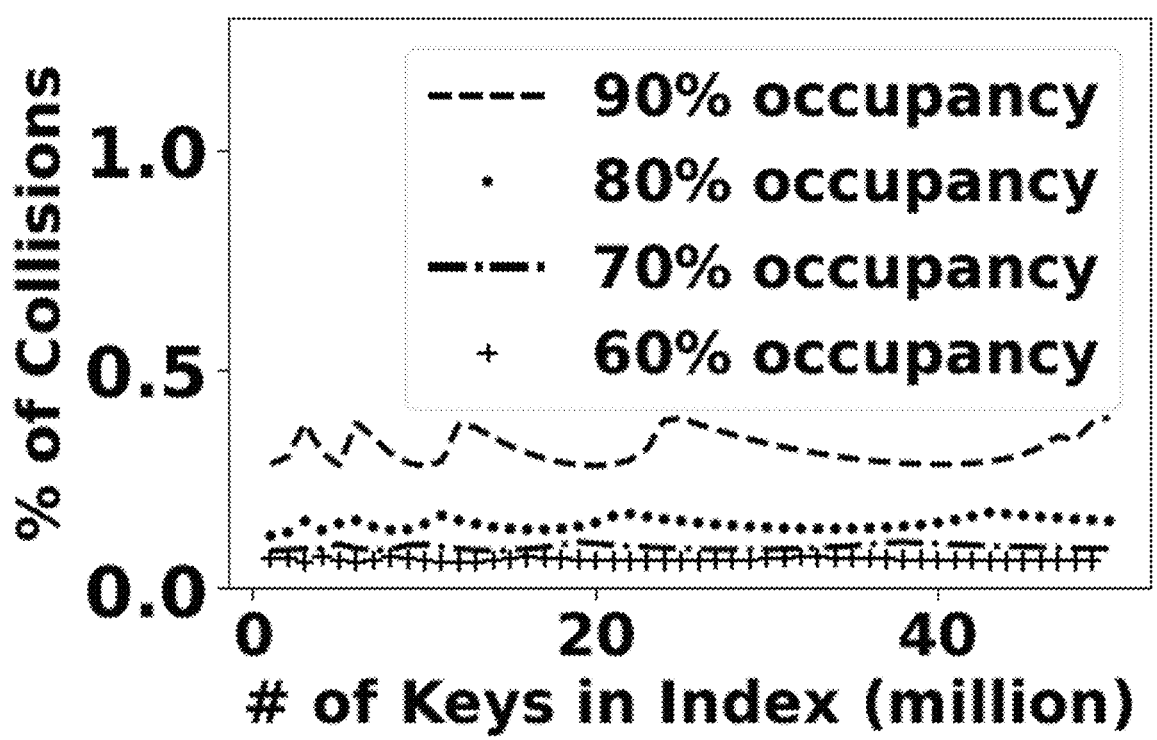
FIG. 3C shows a plot of % of collisions versus number of keys in index (in millions), showing the effect of occupancy on the % of collisions in indexes of different sizes. The dashed curve with the highest value at 20 million is for 90% occupancy; the curve of just dots with the second-highest value at 20 million is for 80% occupancy; the curve of dashes and dots with the third-highest value at 20 million is for 70% occupancy; and the curve of just crosses with the lowest value at 20 million is for 60% occupancy.

The effect of index occupancy on collision was also analyzed to determine optimal occupancy threshold for better collision management. Referring to FIG. 3C, collision handling degrades heavily above 80% index occupancy.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for optimizing internal metadata management of a key-value solid state drive (KVSSD), the system comprising:
a processor; and
a machine-readable medium in operable communication with the processor and having instructions stored thereon that, when executed by the processor, perform the following steps:
receiving data of the KVSSD; and
utilizing a key-to-physical-address (K2P) mapping scheme on the data of the KVSSD to transform variable-sized keys of the data into fixed-size key hashes using a hash function, thereby optimizing the internal metadata management of the KVSSD,
the K2P mapping scheme comprising a two-level hash table with high occupancy, the two-level hash table comprising a first layer and a second layer,
the first layer of the two-level hash table being configured as a directory with D entries, D being an integer,
the second layer of the two-level hash table comprising an index of fixed-size independent hash tables that store metadata of corresponding key-value pairs, and
the value of D being set initially based on the below equation and then updated as the index of the second layer of the two-level hash table is resized, $$D=(\text{anticipated number of keys})/R,$$

where $$R=[p/(kh+ppa+hi)],$$

where p is a flash page size, kh is a key hash size, ppa is a physical page address size, and hi is a hopinfo size, where hopinfo is index occupancy for each bucket.

2. A method for optimizing internal metadata management of a key-value solid state drive (KVSSD), the method comprising:
receiving, by a processor, data of the KVSSD; and
utilizing, by the processor, a key-to-physical-address (K2P) mapping scheme on the data of the KVSSD to transform variable-sized keys of the data into fixed-size key hashes using a hash function, thereby optimizing the internal metadata management of the KVSSD,
the K2P mapping scheme comprising a two-level hash table with high occupancy, the two-level hash table comprising a first layer and a second layer,
the first layer of the two-level hash table being configured as a directory with D entries, D being an integer,
the second layer of the two-level hash table comprising an index of fixed-size independent hash tables that store metadata of corresponding key-value pairs, and
the value of D being set initially based on the below equation and then updated as the index of the second layer of the two-level hash table is resized, $$D=(\text{anticipated number of keys})/R,$$

where $$R=[p/(kh+ppa+hi)],$$

where p is a flash page size, kh is a key hash size, ppa is a physical page address size, and hi is a hopinfo size, where hopinfo is index occupancy for each bucket.

3. A system for optimizing internal metadata management of a key-value solid state drive (KVSSD), the system comprising:
a processor; and
a machine-readable medium in operable communication with the processor and having instructions stored thereon that, when executed by the processor, perform the following steps:
receiving data of the KVSSD; and
utilizing a key-to-physical-address (K2P) mapping scheme on the data of the KVSSD to transform variable-sized keys of the data into fixed-size key hashes using a hash function,
thereby optimizing the internal metadata management of the KVSSD,
the K2P mapping scheme comprising a two-level hash table with high occupancy, the two-level hash table comprising a first layer and a second layer,
the first layer of the two-level hash table being configured as a directory with D entries, D being an integer, the second layer of the two-level hash table comprising an index of fixed-size independent hash tables that store metadata of corresponding key-value pairs, the fixed-size key hashes being 64-bit key hashes, the utilizing of the K2P mapping scheme comprising using the fixed-size key hashes as identifiers of the variable-sized keys, respectively, the value of D being set initially to an arbitrary value or to a value based on the below equation, and then updated as the index of the second layer of the two-level hash table is resized, $D = \text{(anticipated number of keys)}/R,$ where $R = [p/(kh+ppa+hi)],$ where p is a flash page size, kh is a key hash size, ppa is a physical page address size, and hi is a hopinfo size, where hopinfo is index occupancy for each bucket, the first layer of the two-level hash table being accessed via solid state device (SSD) dynamic random access memory (DRAM), a periodically updated persistent copy of the D entries of the first layer of the two-level hash table residing on flash memory, the second layer of the two-level hash table being served from the flash memory or cache, the utilizing of the K2P mapping scheme comprising utilizing the fixed-size key hashes for probabilistic membership checking, and the utilizing of the K2P mapping scheme comprising resizing the index of the second layer of the two-level hash table when a total occupancy of the index of the second layer of the two-level hash table reaches a predetermined threshold.

* * * * *